United States Patent Office 2,697,320
Patented Dec. 21, 1954

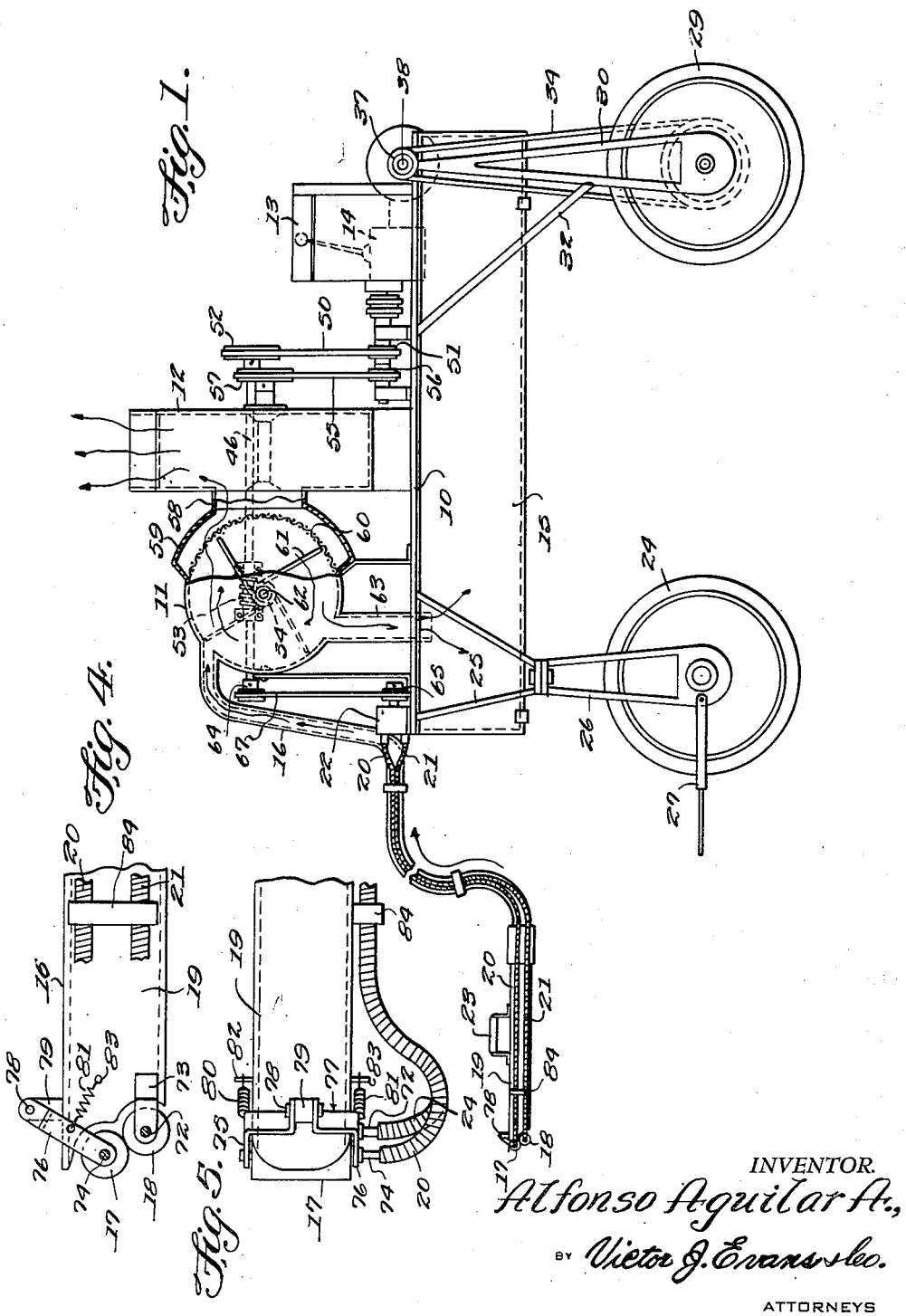

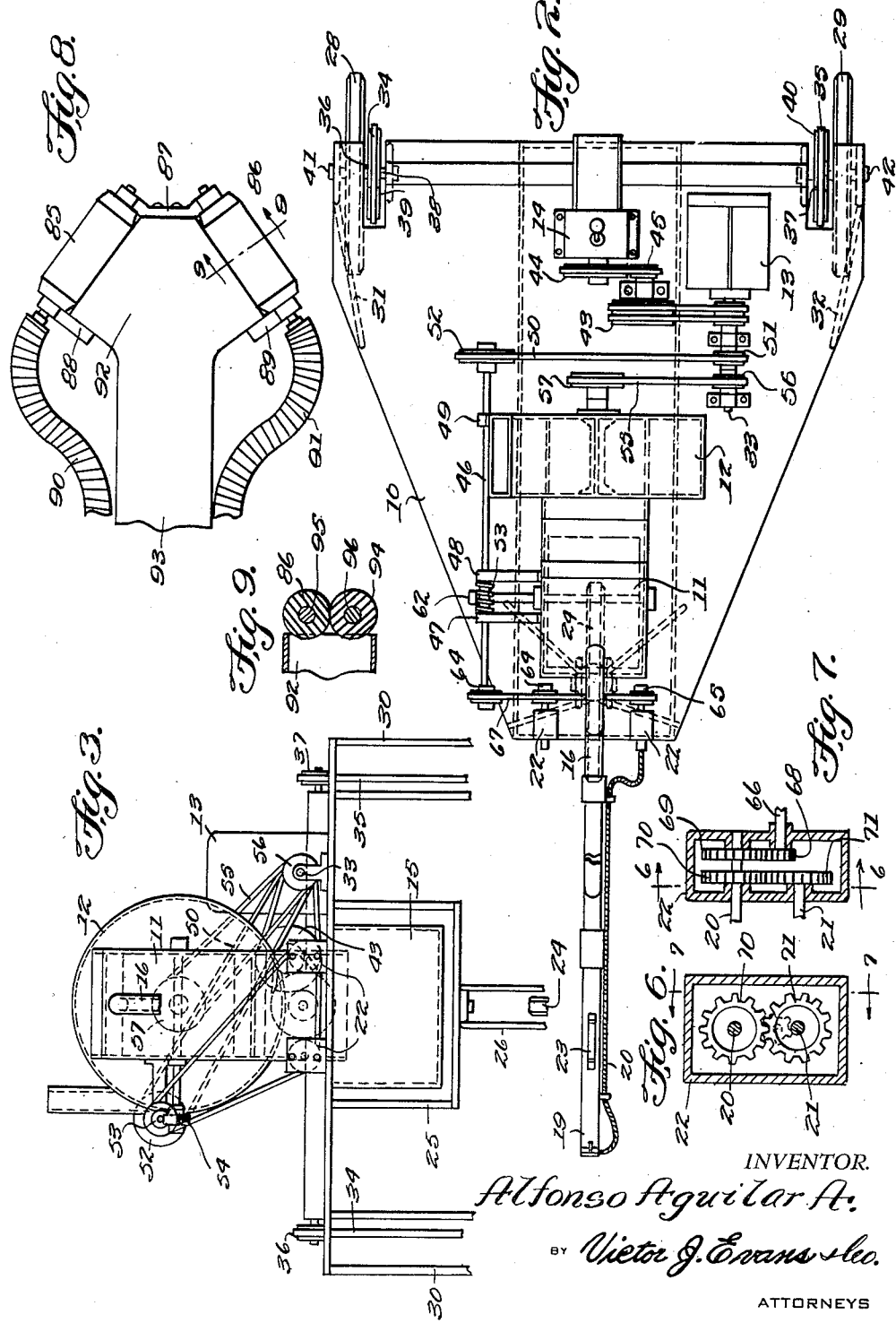

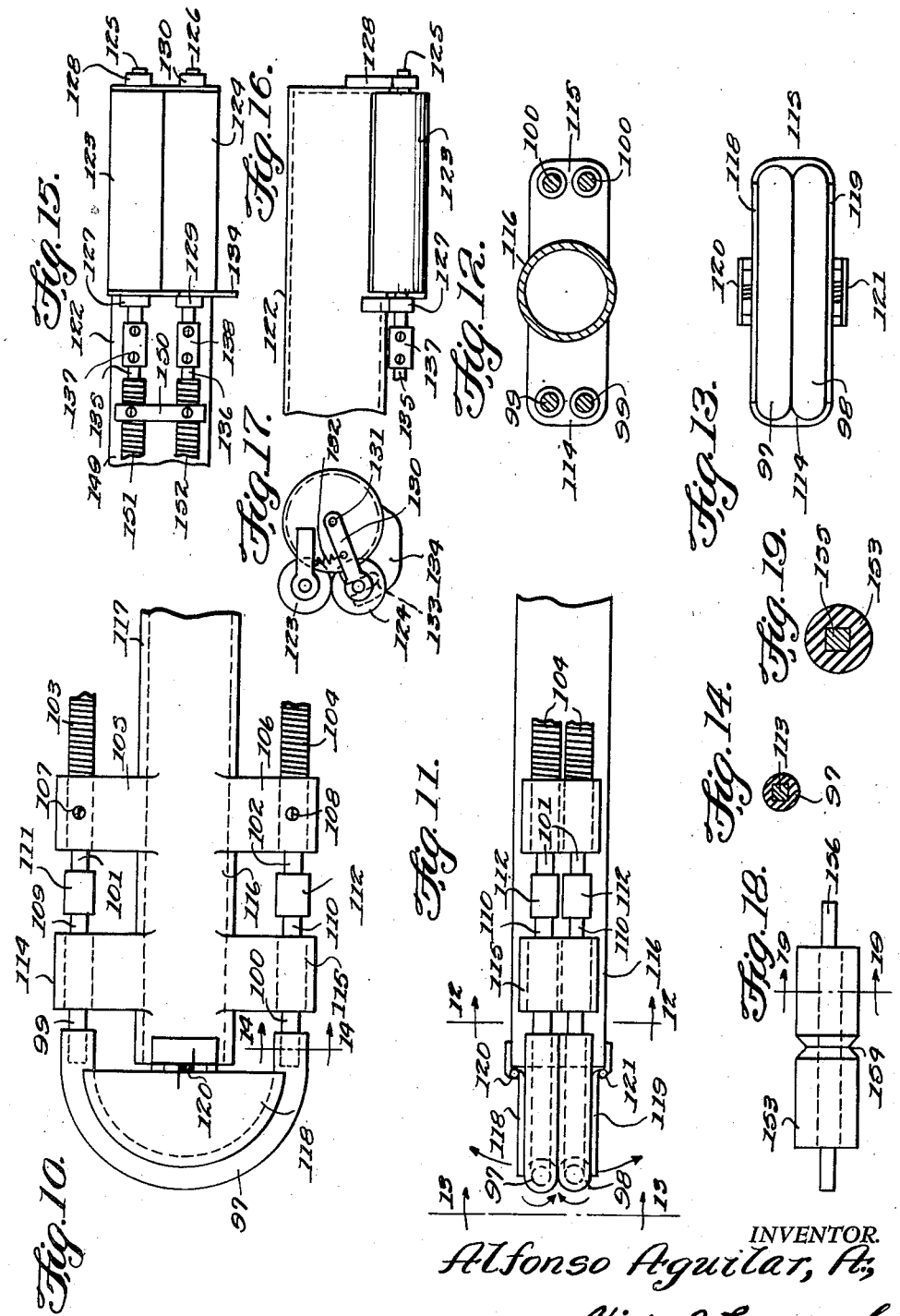

2,697,320

COTTON-PICKING HEAD

Alfonso Aguilar A., El Paso, Tex.

Application December 18, 1950, Serial No. 201,319

1 Claim. (Cl. 56—32)

This invention relates to cotton picking machines of the type wherein cotton is removed from plants by suction through gripping elements carried by a machine traveling through a field of cotton, and in particular a machine having accurate or cylindrical oppositely rotating picking elements carried by a flexible duct suspended from a machine and having means for providing suction in the duct whereby cotton is conveyed by suction to a feeding element which separates trash and refuse and feeds the clean cotton to a hopper and in which the dust, dirt, and the like removed from the cotton in the feeding element are discharged by a blower mounted in combination with the said feeding element.

The purpose of this invention is to provide a cotton picker having a cleaning element in combination therewith and in which the picking devices include the combination of mechanical and suction means.

Various types of suction nozzles have been provided for removing cotton from cotton plants and other devices have been provided for positively gripping the cotton but it is difficult to remove all of the cotton by suction and the mechanical raking or gripping elements destroy the plants. With this thought in mind this invention contemplates cotton picking means including resilient gripping elements in combination with suction means whereby the cotton only, is removed from the plants and suction means carries the cotton to a feeder and cleaner in which dust and dirt is removed and the clean cotton is deposited or fed into a storage hopper.

The object of this invention is, therefore, to provide a complete cotton picking machine in which cotton is removed from plants by oppositely rotating rollers or tubes and in which the cotton is fed from the tubes to feeding, cleaning, and storage means by suction.

Another object of the invention is to provide a cotton harvesting and cleaning machine in which operating, suction, and cleaning elements are mounted on a common platform.

A further object of the invention is to provide a cotton harvesting and cleaning machine which is of a comparatively simple and economical construction.

With these and other objects and advantages in view the invention embodies an elevated horizontally disposed platform mounted on wheels with a rotary feeder, a blower, an engine, and a compressor mounted on the platform and with a receiving hopper, suspended from the platform.

Other features and advantages of the invention will appear from the following description taken in connection with the drawings wherein:

Figure 1 is a side elevational view illustrating the cotton picker with parts broken away showing a screen between the feeding element and blower.

Figure 2 is a plan view of the cotton picker.

Figure 3 is a front elevational view of the cotton picker with the lower part of the frame broken away.

Figure 4 is an enlarged side elevational view of one of the cotton picking elements suspended from the platform of the machine, and with part broken away.

Figure 5 is a plan view of the cotton picking element as shown in Figure 4.

Figure 6 is an enlarged cross section taken on line 6—6 of Figure 7 showing the gears for operating the oppositely rotating shafts of the gripping elements.

Figure 7 is a cross section taken on line 7—7 of Figure 6 showing the gear casing through which the oppositely rotating flexible shafts are operated.

Figure 8 is a plan view of the head of the picker duct, similar to that shown in Figure 5, showing a modification wherein vertically positioned pairs of rollers are mounted in angular relation on the sides of the head.

Figure 9 is a cross section through rollers on one side of the head, being taken on line 9—9 of Figure 8.

Figure 10 is also a plan view showing a further modification of the picker duct head and showing a pair of arcuate tubular oppositely rotating elements carried by the outer end of the head.

Figure 11 is a side elevational view of the head shown in Figure 10.

Figure 12 is a cross section through the head shown in Figures 10 and 11 being taken on line 12—12 of Figure 11.

Figure 13 is an end elevational view of the head shown in Figures 10 and 11 being taken on line 13—13 of Figure 11.

Figure 14 is a detail showing a section taken on line 14—14 of Figure 10 illustrating the connection between one of the flexible shafts and arcuate tubes at the end of the head.

Figure 15 is a side elevational view of a picker head showing a further modification wherein a pair of picking rollers is positioned at one side of the head.

Figure 16 is a plan view of the head shown in Figure 15.

Figure 17 is an end elevational view of the head shown in Figures 15 and 16.

Figure 18 is an enlarged detail showing one of the picking rollers used in the design shown in Figures 4, 8 and 15, illustrating a further modification wherein annular grooves are provided in the rollers.

Figure 19 is a cross section taken on line 19—19 of Figure 18 showing the square section of the flexible shaft upon which the rollers are positioned.

Referring now to the drawings wherein like reference characters denote corresponding parts the cotton picking machine of this invention includes a platform 10, a suction feeder 11 mounted on the platform, a blower 12 also mounted on the platform and connected to the feeder 11, a motor 13 and a transmission 14, both of which are also positioned on the platform, and a receiving hopper 15 which is suspended below the platform. A flexible duct 16 extends from the forward end of the platform and cotton picking or gripping elements including oppositely rotating friction rollers 17 and 18 are journaled in a head 19 at the forward end of the duct, the rollers being rotated by flexible shafts 20 and 21 from a gear housing 22, and with the forward end of the duct held by a handle 23 on the upper surface thereof the head of the duct may be manipulated to pick cotton from plants in a field through which the machine is traveling.

The platform 10 is carried by a wheel 24 at the front which is pivotally connected to the forward end of a section 25 of the frame through a yoke 26, as illustrated in Figure 1, and the wheel yoke is provided with a hitch 27 by which the picker may be attached to a tractor, or the like.

The opposite end of the platform is supported by wheels 28 and 29 which are journaled in frames 30 and the frames 30 are supported from the platform 10 by side bars 31 and 32.

The suction feeder, blower and picking elements are driven by the engine 13 through a counter shaft 33, extended from the engine shaft and the rear wheels 28 and 29 are driven from the transmission 14 with belts 34 and 35 trained over pulleys 36 and 37 on a shaft 38 and pulleys 39 and 40 on the wheel axles 41 and 42.

The transmission 14 is driven from the motor 13 by belts 43 and 44, through a jack shaft 45.

A shaft 46, journaled in bearings 47, 48 and 49 on the suction feeder and blower is rotated by a belt 50 on the countershaft 33, the belt being trained over pulleys 51 and 52. The shaft 46 drives the suction feeder through a worm 53 and a worm gear 54.

The blower 12 is also rotated from the shaft 33 with the rotor thereof actuated by a belt 55 that is trained over pulleys 56 and 57. The blower is connected to the suction feeder through a chute 58 that extends from an enlarged section 59 on the housing of the feeder and a screen 60 is provided between the section 59 and interior of the feeder so that only dust, dirt, particles of leaves and the like pass from the suction feeder to the blower 12.

The blades 61 of the suction feeder are carried by a shaft 62, on the outer end of which the worm gear 54 is mounted and with the blades traveling in a clockwise direction air is drawn in from the duct 16 which provides suction on the picking head and after traveling over the screen 60 cotton carried by the air is deposited through a chute 63 into the storage bin 15 suspended below the platform 10.

The picking rolls 17 and 18 which are journaled in the head 19 are rotated by the shaft 46 through the gear housing 22 and the flexible shafts 20 and 21 and, as illustrated in Figures 1, 6 and 7 a pulley 64 on the shaft 46 drives a pulley 65 on a shaft 66 through a belt 67 and with the shaft 66 journaled in the gear housing 22 a gear 68 on the inner end thereof, which meshes with a gear 69 on the inner end of the flexible shaft 20, which is journaled in the gear housing, as shown in Figure 7, rotates the shaft 20, and a gear 70 on the shaft 20, that meshes with a gear 71 on the shaft 21, rotates the shaft 21 which is also journaled in the gear housing.

As illustrated in Figure 4 the lower roller 18, which is mounted on a shaft 72 is journaled in stationary bearings 73 on the sides of the head 19 of the duct 16 and the upper roller 17, which is mounted on a shaft 74 is journaled in the ends of swinging arms 75 and 76 of a bracket 77 that is journaled by a pin 78 on a bearing 79. The roller 17 is resiliently urged into engagement with the roller 18 by springs 80 and 81 which are connected to the arms 75 and 76, respectively and to projections 82 and 83 on the sides of the head 19.

The ends of the shafts 72 and 74 on which the rollers 18 and 17 are mounted, respectively extend outwardly to receive reflexible shafts 20 and 21, as illustrated in Figure 5. A bearing 84 is provided on the side of the duct 16 for holding the flexible shafts 20 and 21 and similar bearings may be provided at spaced intervals on the duct.

It will be understood that with the picking head of the duct 16 formed in this manner the head is held against cotton bolls on cotton plants and the rollers strip the cotton from the plants with the suction drawing the cotton removed from he plants through the picking head and duct 16 into the feeder 11 where it is cleaned and from which the cotton drops through the chute 63 into the hopper 15.

In the design illustrated in Figures 8 and 9 pairs of rollers, as indicated by the numerals 85 and 86 are mounted on shafts journaled in brackets 87, 88 and 89 and with the rollers 85 on one side carried by flexible shaft 90, corresponding to the shafts 20 and 21, and the rollers 86 on the opposite side carried by similar shafts 91 the rollers will be actuated whereby the rollers operate with the inner surfaces turning inwardly so that cotton may be removed or stripped from plants, similar to the action of the rollers 17 and 18. In this design the pairs of rollers are carried by a head 92 similar to the head 19 and the head is carried by the outer end of a duct 93, similar to the duct 16. A pair of rollers on one side of the head is illustrated in Figure 9 wherein the upper roller is indicated by the numeral 86 and the lower roller by the numeral 94 and, as shown, the roller 86 is mounted on a shaft 95 and the roller 94 on a similar shaft 96, both of the shafts being driven by flexible shafts similar to the shafts 20 and 21, and indicated by the numeral 91.

In the design illustrated in Figures 10, 11, 12 and 13 the cotton picking elements are formed of tubes 97 and 98 which are formed substantially semi-circular and the ends of the tubes are carried by square ends 99 and 100 of flexible shafts 101 and 102, corresponding to the shafts 20 and 21. The flexible shafts are carried in spiral or flexible casings 103 and 104 and the casings are held in brackets 105 and 106, respectively, in which they are secured by set screws 107 and 108.

The flexible shafts 101 and 102 are connected to shaft sections 109 and 110, respectively by couplings 111 and 112 and the intermediate parts of the shafts 109 and 110 are provided with bushings 113 by which the shafts are journaled in bearings 114 and 115 on the sides of the head 116 and a duct 117, corresponding to the duct 16.

The picking head of this design is provided with plates 118 and 119 which are secured to the upper and lower surfaces, respectively of the head 116 by spring hinges 120 and 121. The shafts 109 and 110 are provided with square ends 99 and 100, respectively which extend into the ends of the tubular elements 97 and 98, as shown in Figure 10.

In the design illustrated in Figures 16 and 17 a picking head 122 is provided with friction rollers 123 and 124 and, as shown, the rollers are journaled in an opening in one side of the head with the roller 123 mounted on the shaft 125 and roller 124 mounted on the shaft 126. The shaft 125 is journaled in bearings 127 and 128 which are fixedly mounted on the head and the roller 124 is journaled by the shaft 126 thereof in arms 129 and 130 which are pivotally mounted by pins 131 on the head and resiliently held by springs 132. The shaft 126 of the roller 124 extends into a slot 133 in a bracket 134 which extends downwardly from the head 122 to provide a guide for the shaft.

The shafts 125 and 126 are connected to flexible shafts 135 and 136 by couplings 137 and 138, respectively and the shafts 135 and 136, which correspond to the shafts 20 and 21, of the design shown in Figure 1, are secured to the sides of a duct 149, similar to the duct 16 by a bracket 150 with the shaft extended through flexible casings 151 and 152.

It will be understood, as illustrated in Figures 18 and 19 that the friction cotton picking rollers may be formed with continuous surfaces as shown in Figures 5, 8, and 15 or the rollers may be formed as illustrated in Figures 18 and 19 wherein friction rollers 153 are provided with annular grooves 154 and the rollers are mounted on square sections 155 of shafts as indicated by the numeral 156. It will be understood that the rollers may, therefore, be formed in different designs and may be mounted upon the picking head in different positions.

With the parts arranged in this manner the cotton picker is drawn through a field of cotton with one or a plurality of ducts, such as the duct 16 extended from the platform and with pickers following the different rows the oppositely rotating rollers in the heads carried by the ducts are held against the cotton bolls of the plants whereby the rollers strip the cotton from the plants drawing the cotton into the heads of the ducts where suction of the suction feeder and blower draws the cotton through the ducts with the blower removing dust, dirt, particles of leaves and the like and with the clean cotton dropping through the chutes into the hopper 15 below the platform 10. The refuse is blown into the atmosphere through an opening or chute inside of the blower housing.

It will be understood that other modifications may be made in the design and arrangement of the parts without departing from the spirit of the invention.

What is claimed is:

In a cotton picking machine of the type including a mobile platform, a hopper positioned below said platform, a suction feeder and blower mounted on said platform, and a flexible duct extending from said feeder and connected at one end thereto, the improvement comprising a head adapted to be connected to the other end of said duct, upper and lower oppositely rotating friction rollers having smooth outer surfaces journaled in said head, a handle connected to said head, a lower driven shaft supporting said lower roller, stationary bearings secured to said head for rotatably supporting said lower driven shaft, an upper driven shaft for supporting said upper roller, a mounting member connected to and extending upwardly from said head, a bracket comprising swingable arms supporting said upper driven shaft and said arms being pivotally connected to said mounting member, projections arranged on said head, coil springs extending between said projections and said arms and connected thereto for urging said upper roller towards said lower roller, flexible shaft members connected to the ends of said driven shafts, and bearings connected to said duct for supporting said flexible shaft members.

References Cited in the file of this patent

UNITED STATES PATENTS

| Number | Name | Date |
| --- | --- | --- |
| Re. 15,855 | Stukenborg | June 3, 1924 |
| 59,695 | Whelpley et al. | Nov. 13, 1866 |
| 477,177 | Groom | June 14, 1892 |
| 682,816 | Siefert | Sept. 17, 1901 |
| 723,997 | Faulkner | Mar. 31, 1903 |
| 755,714 | Sharpe | Mar. 29, 1904 |

(Other references on following page)

UNITED STATES PATENTS

| Number | Name | Date |
|---|---|---|
| 767,058 | Harvin | Aug. 9, 1904 |
| 859,204 | Dana | July 9, 1907 |
| 872,340 | Greene | Dec. 3, 1907 |
| 946,454 | Mays | Jan. 11, 1910 |
| 1,059,270 | Brown | Apr. 15, 1913 |
| 1,090,606 | Epps | Mar. 17, 1914 |
| 1,096,325 | Stewart | May 12, 1914 |
| 1,139,492 | Creekmore | May 18, 1915 |
| 1,287,433 | Radford | Dec. 10, 1918 |
| 1,332,425 | Cassel | Mar. 2, 1920 |
| 1,398,930 | Bennett | Nov. 29, 1921 |
| 1,426,326 | Stukenborg | Aug. 15, 1922 |
| 1,638,867 | Melton | Aug. 16, 1927 |
| 1,670,674 | Wirth | May 22, 1928 |
| 1,727,774 | Houghton | Sept. 10, 1929 |
| 1,833,346 | Ziegler | Nov. 24, 1931 |
| 1,836,547 | Onsrud | Dec. 15, 1931 |
| 1,916,704 | Willett et al. | July 4, 1933 |
| 1,971,349 | Koon | Aug. 28, 1934 |
| 2,123,405 | Court | July 12, 1938 |